(No Model.) 6 Sheets—Sheet 1.

E. W. FOWLER.
DEVICE FOR OPERATING SAFE BOLT WORK.

No. 331,390. Patented Dec. 1, 1885.

Witnesses
Inventor
Elbert W. Fowler (No Model.) 6 Sheets—Sheet 2.
E. W. FOWLER.
DEVICE FOR OPERATING SAFE BOLT WORK.

No. 331,390. Patented Dec. 1, 1885.

Witnesses.
A. W. Bond
Harry T. Jones

Inventor.
Elbert W. Fowler (No Model.) 6 Sheets—Sheet 3.

E. W. FOWLER.
DEVICE FOR OPERATING SAFE BOLT WORK.

No. 331,390. Patented Dec. 1, 1885.

Witnesses.
O. W. Bond
Harry T. Jones

Inventor.
Elliott W. Fowler (No Model.) 6 Sheets—Sheet 4.
E. W. FOWLER.
DEVICE FOR OPERATING SAFE BOLT WORK.

No. 331,390. Patented Dec. 1, 1885.

Witnesses. Inventor.

(No Model.) 6 Sheets—Sheet 5.

E. W. FOWLER.
DEVICE FOR OPERATING SAFE BOLT WORK.

No. 331,390. Patented Dec. 1, 1885.

Witnesses.
O. W. Bond
Harry T. Jones

Inventor.
Elbert W. Fowler (No Model.) 6 Sheets—Sheet 6.

E. W. FOWLER.
DEVICE FOR OPERATING SAFE BOLT WORK.

No. 331,390. Patented Dec. 1, 1885.

Witnesses.
Inventor.

UNITED STATES PATENT OFFICE.

ELBERT W. FOWLER, OF CHICAGO, ILLINOIS.

DEVICE FOR OPERATING SAFE BOLT-WORK.

SPECIFICATION forming part of Letters Patent No. 331,390, dated December 1, 1885.

Application filed July 28, 1885. Serial No. 172,919. (No model.)

*To all whom it may concern:*

Be it known that I, ELBERT W. FOWLER, residing at Chicago, in the county of Cook and State of Illinois, and a citizen of the United States, have invented a new and useful Improvement in Devices for Operating Safe Bolt-Work, of which the following is a full description, reference being had to the accompanying drawings, in which—

Fig. 4 is an elevation representing the contents of the case shown in Fig. 3, the front of the case and the dial being removed. This figure shows a worm-gear and crank, and devices for automatically transferring the electric current from one magnet to another for the purpose of rotating the tumblers and dial, and it also shows the mechanism for switching the electric current to rotate the tumblers in opposite directions. (Figs. 29, 30, and 31 parts shown in my former patent, No. 317,986.)

It has been found desirable to make the doors of safes and vaults solid—that is to say, without holes for handles—and time-locks and automatic devices have been used for throwing the bolt-work of such doors, the bolt-work being cast to lock the door when the same is closed and the bolts being retracted at a predetermined time by the action of the time mechanism. Hitherto access could not be had to such safes at any time after the door was closed before the predetermined time for opening.

The leading objects of my invention are, to provide means by which access may be had to the safe for a limited time after locking it and for a limited time before it is unlocked by the time mechanism; to provide means for locking the safe or vault during the day, to be unlocked by the time mechanism, and at the same time permit access to the safe, if desired; also to provide means for locking and unlocking such doors without the use of a time mechanism by means of an electro-magnetic permutation-engine, which I accomplish as illustrated in the drawings.

Figure 29:
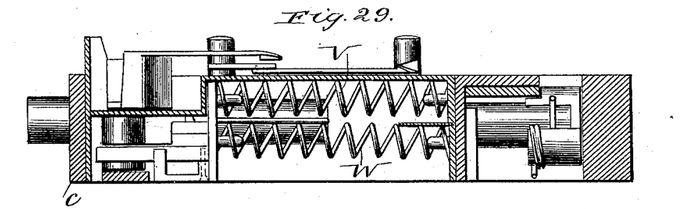
Fig. 29 is a section at line *y* of Fig. 1, showing the power for casting and retracting the bolts, operating in both directions.
Figure 30:
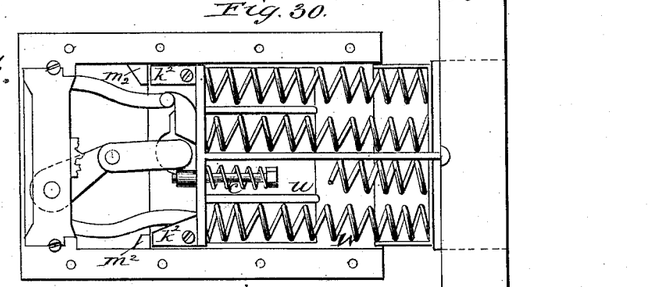
Fig. 30 is a rear view of the devices for automatically operating the bolt-work by power acting in both directions, showing, also, a spring-cushion.
Figure 31:
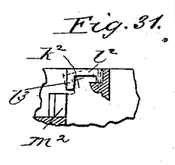
Fig. 31 is a detail showing a stop to prevent the action of the retracting-power in certain cases.

In the drawings, A are bolts. B is a case open on the back side, in which springs which cast and retract the bolts are located. C D E are levers. $a$ is a detent to engage the hook $b$ on D. These parts and the parts represented in Figs. 29, 30, 31 are all substantially the same as corresponding parts shown and described in my former patent, No. 317,986, and therefore they need not be here very fully described.

F is a case containing a suitable time mechanism, which, through suitable connections, will at a predetermined time release the detent $a$ in the usual manner.

G is a case containing magnets H H' I I'.

J is a ratchet-wheel.

$d$ is a pivoted armature-lever having pallets at the lower end which engage the wheel J.

J' is another ratchet-wheel.

$e$ is another pivoted armature-lever provided with pallets engaging with the wheel J'.

Figure 19:
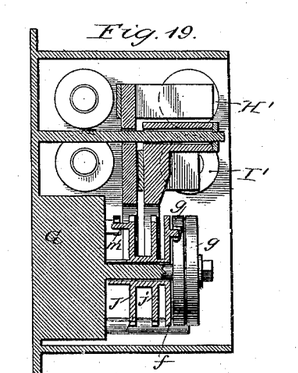
Fig. 19 is a vertical section of the parts shown, taken at line *x* of Fig. 1.
Figure 20:
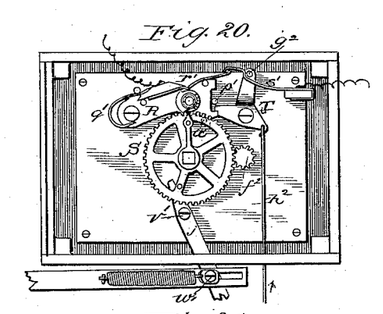
Fig. 20 is an elevation showing the time mechanism when the bolts are unlocked, as in Fig. 1.
Figures 21, 25:
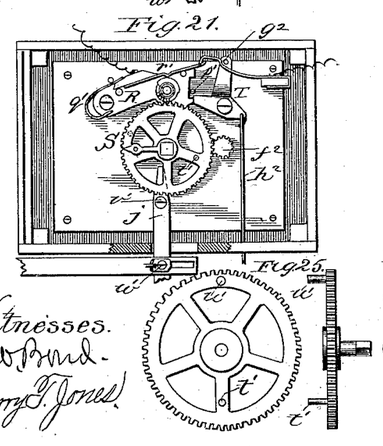
Fig. 21 is the same as Fig. 20, except that the parts are in the locked position, and the hand is set to connect the wires for four hours, as in Fig. 2.
Figs. 25, 26, 27, and 28 are enlarged details.
Figures 22, 23:
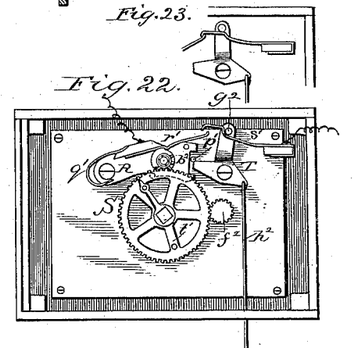
Fig. 22 is an elevation showing part of the time mechanism and the method of connecting the wires by hand, so that the electric mechanism can be used for unlocking the safe.
Fig. 23 is a detail.

$f$ (see Fig. 19) is a driving-tumbler. This tumbler and the two escapement-wheels J J' are operated together. The teeth upon J J' stand in opposite directions.

$g$ are two tumblers. The tumblers $g$ and the driving-tumbler $f$ are such as are found in combination-locks. I have shown only two tumblers $g$; but more could be used. The magnets, armatures, and permutation-tumblers in case G constitute an electro-magnetic permutation-engine.

$h$ (see Fig. 1) is a fence such as is commonly used in combination-locks. It is provided with an arm, which is pivoted to the bar $i$, which bar has a slot at its opposite end, through which slot a pin, which is secured to the lever $j$ of the time mechanism, passes.

$k$ is a spring.

$l$ are springs for the purpose of holding the pallets out of action, if gravity be not sufficient for that purpose.

The parts B F G are all located upon the inside of the safe.

K is a case, which may be secured in any suitable place outside of the safe.

L is a dial, graduated as is customary with the dials of combination-locks. This dial is located outside of the case K and is mounted upon a shaft, $m$, upon which it can be secured by a thumb-screw, $n$, so that it will rotate with the shaft, or, the thumb-screw being loosened, it can be rotated upon the shaft.

M is a toothed wheel secured to the shaft $m$, which wheel M is operated by the worm-wheel N upon a shaft, $o$.

Figure 4:
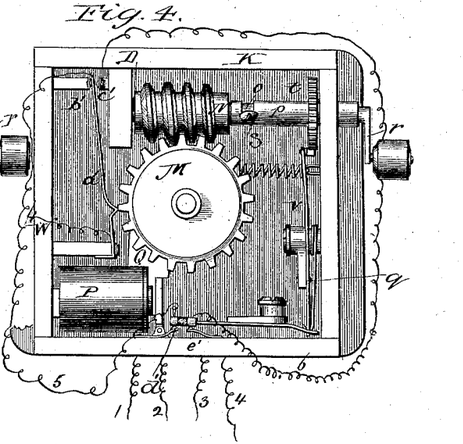
Figure 9:
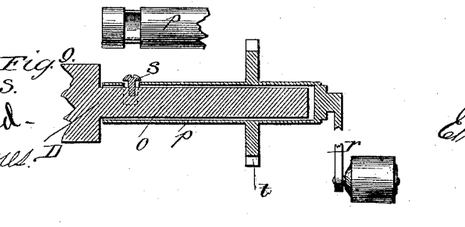
Fig. 9 is a detail.
Figure 10:
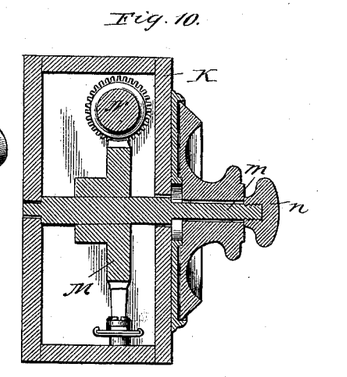
Fig. 10 is a section at line *x* of Fig. 3, some parts being omitted.

$p$ is a sleeve, which is provided with a slot near its inner end. (See Figs. 4 and 9.) This sleeve is not fast on the shaft and can partially rotate thereon, and the sleeve is provided with a crank, $r$, outside of the case K.

$s$ is a screw or pin secured to the shaft $o$.

$t$ is a toothed wheel on the sleeve $p$.

$u$ is a switch which is arranged to make connection with the magnets H H' or I I' at pleasure. The switch is operated by a lever, $v$, which lever is operated by the wheel $t$.

$q$ is a spring which causes the lever $v$ to engage with the wheel $t$.

Figure 5:
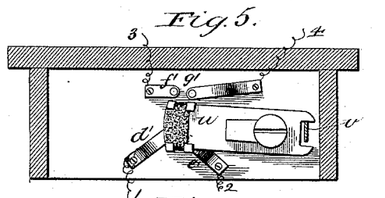
Figs. 5 and 6 are details.
Figure 6:
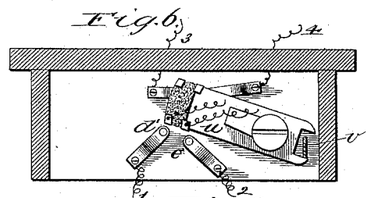
Figure 7:
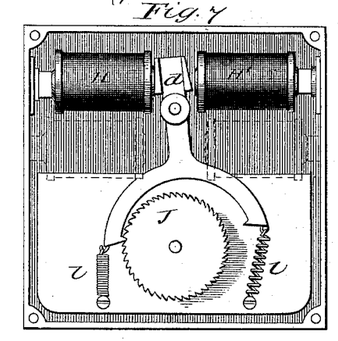
Fig. 7 is an elevation showing the magnets, lever, pallets, and escapement-wheel for rotating and driving the tumblers in one direction, (to the left.)
Figure 8:
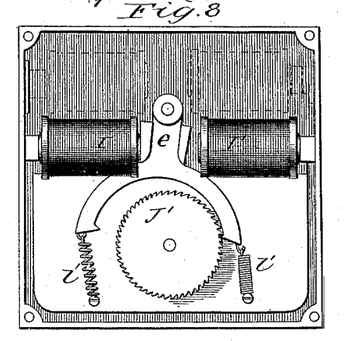
Fig. 8 represents corresponding devices for driving the tumblers in the other direction.

$w$ is a wire connected at one end to a battery, and the other end is connected with the spring $a'$, the lower end of which is secured to a non-conducting support, and the upper end can be made to vibrate between the two points $b'$ $c'$ by the action of the toothed wheel M upon such spring, the toothed wheel forcing the spring over against the point $b'$, and the action of the spring carrying it over to the other point, $c'$, and thus by suitable wires running from the switch and from the connecting-points to the battery and magnets the current can be sent through the magnets H H' or I I' at pleasure. The wires 1 2 lead from connecting-points $d'$ $e'$ to the magnets I I', and the wires 3 4 (see Figs. 5 and 6) lead from connecting-points $f'$ $g'$ to the magnets H H'. Wires 5 and 6 are arranged to lead from the switch to the points $b'$ $c'$.

Figure 11:
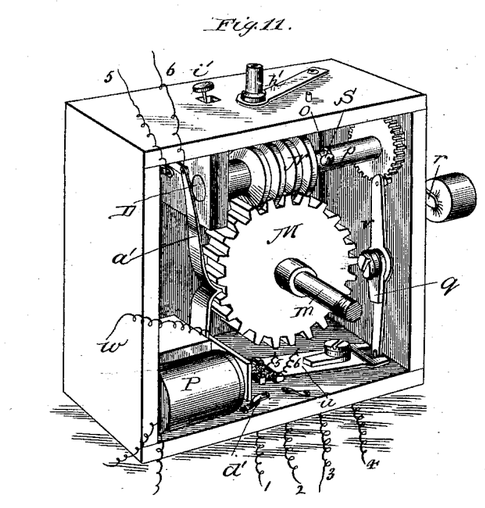
Fig. 11 is a perspective showing the switching mechanism and parts of the bell mechanism, the principal parts shown being the same as those represented in Fig. 4, the armature-lever being omitted.

O is a bell or gong on top of the case K. It is mounted on a swinging arm, $h'$, Fig. 11, so that, if desired, it can be moved away from the striker $i'$.

P is a magnet for operating the bell.

Figures 12, 13:
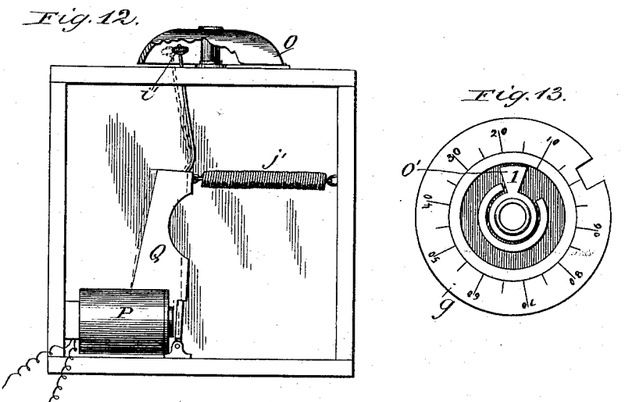
Fig. 12 is an elevation showing the bell mechanism.
Figs. 13, 14, 15, 16, and 17 are details of one of the tumblers and its parts.
Figure 14:
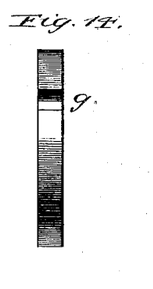
Figure 15:
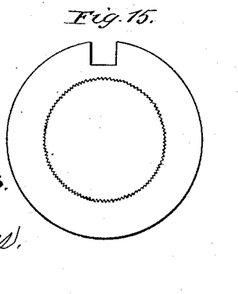
Figures 16, 17:
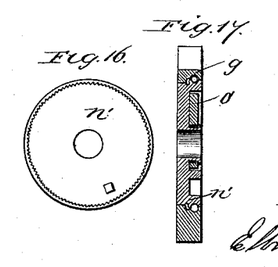

Q is the armature-lever with which the striker $i'$ is connected. (See Figs. 4 and 12.)

$j'$ is a spring connected with the lever Q.

Figure 18:
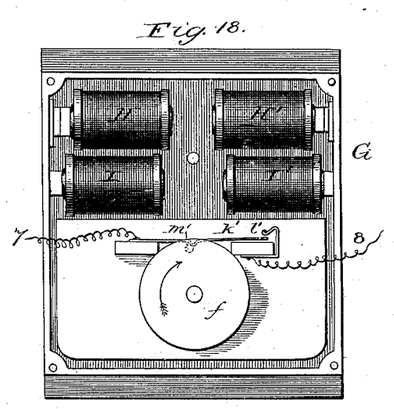
Fig. 18 shows the circuit closer and breaker for the bell-wires.

$k'$, Fig. 18, is a circuit closer and breaker supported in the case G. This spring is raised to close the circuit at the point $l'$ by a pin upon the back side of the ratchet-wheel J', as indicated in Fig. 18 by a dotted line, and designated in Fig. 19 by $m'$. This circuit breaker and closer $k'$ is in the bell-circuit, the bell being constructed and connected in any suitable manner. The pin $m'$ will always be in the same position relative to the driving-pin upon the driving-tumbler $f$, and hence when the pin $m'$ closes the circuit the bell, if connected, will ring, and the instructed operator can know whether the driving and other tumblers are moving in harmony with the dial, and if not the dial can be loosened and set to accord with the position of the driving-pin.

Figs. 13 to 17, inclusive, show one of the adjustable tumblers $g$ and its parts. The central solid part, $n'$, which revolves on the stud and is driven by the driving-pin, has on one side, next to the driving-pin, a movable pin or fly, $o'$, to compensate for the space taken up by the pin or pins, enabling the tumblers to be rotated in either direction and used in combination, which would be impossible with a fixed pin. On the other side of the tumbler is a pin to drive the next tumbler.

Figs. 20 to 28, inclusive, show a time mechanism or parts thereof, and suitable devices for connecting and disconnecting the circuit-wires by the time mechanism, and a supplemental device for the same purpose to be operated by hand.

R is a movable piece provided at one end with a notch, and pivoted at the other end to some support, so that it can move up or down as far the detent pin or stop $p'$ will permit. It is held in its normal position by the spring $q'$.

$r'$ is a spring on R, which spring is insulated and connected with a wire between the magnet or the ground wire of an electric mechanism, or between a battery and magnet.

$s'$ is another spring, connected with the other wire of an operating-circuit, between the electric mechanism and its motive force, or between the electric mechanism and the ground. I prefer to connect with the wire that rotates the driving-tumbler to its unlocked position. When in their normal position, the springs $r'$ $s'$ are disconnected, so that no electric current can pass.

S is a gear-wheel provided with two pins, one of which, $t'$, strikes the lever $j$, moving it into an unlocked position at a predetermined time. The other pin, $u'$, is arranged to engage with the under side of the movable piece R, and by raising it connects the springs $r'$ $s'$, closing the circuit. The time at which this lifting of R will take place by the pin $u'$ may be varied at will by the manufacturer, or by a slight change adjusted by one skilled in the art. This may be done by a user. If this pin $u'$ connects the springs $r'$ $s'$ two hours before the pin $t'$ comes in contact with the lever $j$, the electric mechanism can be used to unlock the safe two hours before the time mechanism unlocks it. This lever $j$ is pivoted at $v'$, is connected with the electric mechanism at $w'$, and its lower end is connected with a link, $a^2$, which is connected with the detent $a$ of the devices which automatically operate the bolt-work. (See Figs. 1, 2, and 20.)

I have provided devices by means of which the springs $r'$ $s'$ may be connected by hand, which are as follows: $b^2$ is a segment of a cog-wheel, the teeth of which mesh into the teeth of the wheel S. It is supported on a short shaft secured to R. $c^2$ is an insulated projection on $b^2$. $d^2$ is a thumb-piece having an index-point thereon. If the timer be wound until the pin $u'$ is several hours removed from the piece R, then by taking hold of the thumb-piece $d^2$ and raising the movable piece R and turning the index-point on $d^2$ until it points, say, to figure 4 on the upper dial, $e^2$, Fig. 1, and then allowing $b^2$ to mesh with S, $r'$ will be connected with $s'$ and then the electric mechanism can be used to unlock the safe for four hours, if the index is properly graduated. $f^2$ is a pinion for operating S.

Some bankers desire to keep their safes locked during the day, with the privilege of having access to them at will. This is impossible with devices for automatically operating the safe bolt-work by the aid of a time mechanism alone. I have provided devices by means of which this can be done in connection with my electric mechanism. T is a supplementary device pivoted to the case, having a stud, $g^2$, at its upper end, engaging with the spring $s'$. $h^2$ is a wire. By pushing up on this wire, T can be made, through the stud $g^2$, to press the spring $s'$ down onto $r'$, closing the circuit. The wheel S has a sleeve or hub projecting through a dial-plate, $i^2$, and carrying a hand, $j^2$.

I will now refer to some of the parts shown in Figs. 29, 30, and 31, a more full description of which is found in my former patent, as before stated.

U is a sliding piece in the case B.

V are springs which retract the bolts, and W springs which cast the bolts.

$c$ is a spring which serves as a cushion to prevent injury to the mechanism by the sudden stoppage of the parts when the bolts have been retracted.

$k^2$ are pieces of metal of the form shown in the drawings, having a thin part, $l^2$. They are riveted or otherwise secured at one end to some part of the sliding piece U, and their free ends extend downward, as shown in Fig. 31.

$l^3$ $m^2$ are projections upon the inside of the case B, and the lower ends of the parts $l^3$ are so arranged that in their normal position they do not come in contact with $m^2$, but if a sudden shock upon the outside of the safe-door should prematurely release the retracting-power such force would act upon the parts $k^2$ and probably bend their thin parts so that the projections $l^3$ would come in contact with $m^2$ and prevent the retracting-power from throwing the bolts back.

Figure 1:
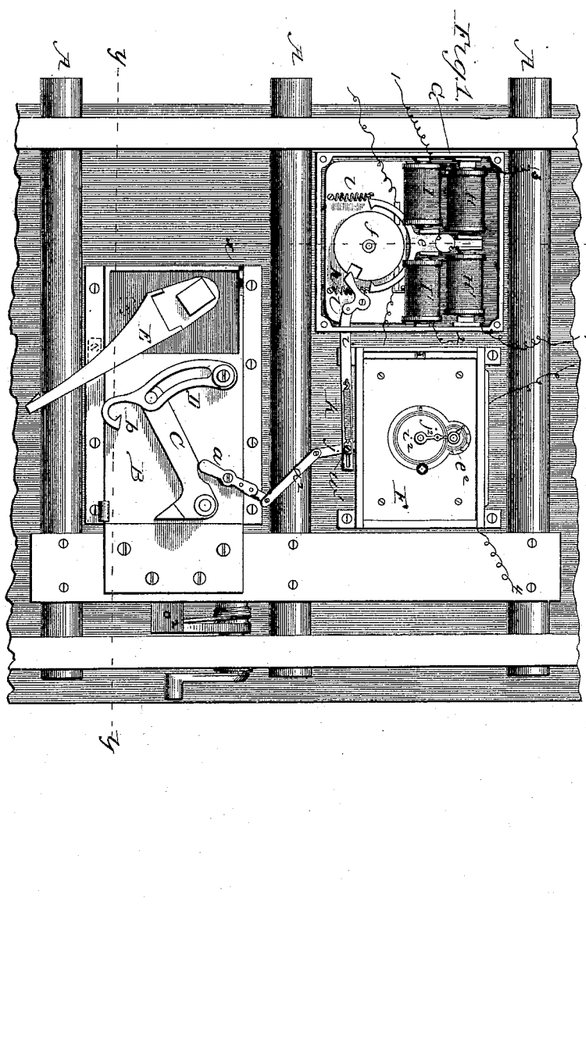
Figure 1 is an elevation showing a part of the inside of a safe-door, also a case which contains the devices for automatically casting and retracting the bolts, a time mechanism, and an electric mechanism and some other parts, the bolts being retracted, and the time mechanism and electric mechanism and the devices in view relating to the automatic retraction of the bolts being in the unlocked position. The covers are removed from the electric mechanism and from the time and the automatic mechanisms.
Figure 2:
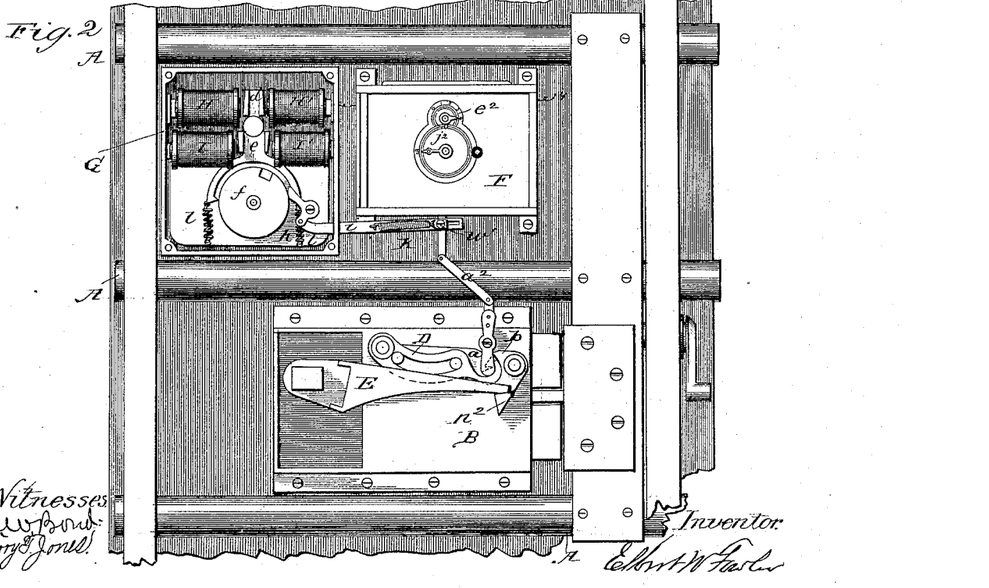
Fig. 2 is an elevation showing the bolts in a locked position, the time mechanism set to unlock in eighteen hours, and the electric mechanism locked and connected or set by hand, so that it may be used to unlock the door until such time as the time mechanism will disconnect—say four hours.
Figure 3:
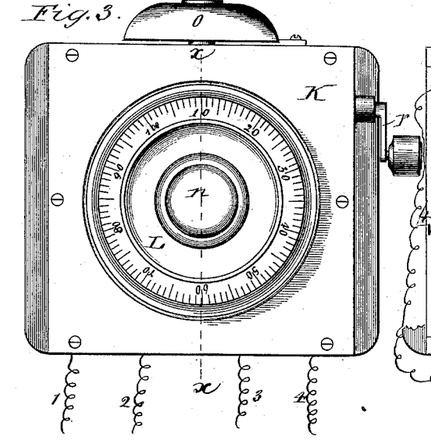
Fig. 3 is an elevation showing a dial upon the front of the case and a crank on the side to move the dial by devices within the case, and a bell.
Figure 24:
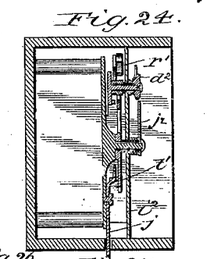
Fig. 24 is a central vertical section of Fig. 22.
Figure 26:
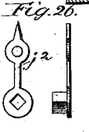
Figure 27:
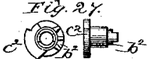
Figure 28:
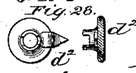

The operation is as follows: Suppose a banker is ready to close the safe at night, the door being open and the bolts retracted, the locking devices being in their normal position, as shown in Fig. 1. The operator then puts the electric mechanism in its locked position, as shown in Fig. 2, and sets the time mechanism as usual, and he may at the same time provide for having access to the safe for a limited period—say four hours—by the use of electric mechanism, after the safe has been locked, which he can do by raising the movable piece R by lifting $b^2$ and turning it until the pointer $d^2$ points to the figure 4 on the index $e^2$, which will bring the cogs upon $b^2$ into engagement with S, and the lifting of the piece R will close the circuit by bringing $r'$ into contact with $s'$, and the circuit will remain closed so long as $b^2$ remains engaged with S, and, the parts being properly constructed, the rotation of S will slightly rotate $b^2$ and throw it out of engagement with S in four hours, then allowing R to drop down and open the circuit. Having adjusted $b^2$ as described, the levers C D are to be brought into the position shown in Fig. 2, and the detent $a$ is to be engaged with the hook $b$. Then by lifting the lever E the sliding piece U can be thrown forward, and by causing the free end of the lever E to engage with the hook $n^2$, U will be held in position, and all of the springs V W will be compressed, the bolts being for the time being held in their unlocked position by a stop, $o^2$, Fig. 1. On closing the vault-door this stop will be released by coming in contact with the door-jamb, and the bolts will be cast by the action of the springs W. Now, at any time while the circuit remains closed at $r'$ $s'$ access can be had to the safe by the banker, who is familiar with the combination, by means of the electric mechanism, as follows: By turning the crank $r$ to the right the switch $u$, through the action of the wheel $t$ and lever $v$, the lower end of which engages with the notch in one end of $u$, will be connected with the points $d'$ $e'$, and the worm-wheel N will cause the wheel M to rotate, and its teeth, coming one after another in contact with the spring $a'$, will force it over against the point $b'$, the spring action of $a'$ returning it into contact with the point $c'$, and thus a current will be sent alternately to the magnets I I' through the switch and wires 1 2, and the action of the magnets on the armature-lever $e$ will cause the pallets to vibrate and act upon the wheel J', revolving it and the driving-tumbler to the right, the dial L at the same time moving in unison. By turning the crank to the left the switch will be shifted to the points $f'$ $g'$, the sleeve P being permitted to turn part way around the shaft $o$ by reason of the slot in the sleeve, and after the switch has been shifted, and when the end of the slot in P comes in contact with the pin $s$ in the shaft $o$, such shaft will then rotate, and the worm-wheel will again cause the wheel M to rotate, and through the wires 3 4 the left-moving magnets H H' and the armature-lever $d$ with its pallets will be brought into action, revolving the wheel J and the driving-tumbler to the left, and one after another the tumblers will be brought into the proper position and combination, and then the fence $h$ will drop into the notches in the tumblers, and through the bar $i$ the lever $j$ will be moved, and through the link $a^2$ the detent $a$ will be released and the retracting-power will retract the bolts. Before the tumblers come into position to receive the fence into their notches, the locking devices, which are in view, will be in the position shown in Fig. 2, their released position being shown in Fig. 1. The spring $k$ is to hold the detent in a locked position, and the slot in the bar $i$ is to permit the time mechanism to act upon the detent without the aid of the electric mechanism. A little play is provided on the spring side of the stud which passes through this slot. The lever $j$ cannot move farther to the left than indicated in the drawings, because it will be checked by coming in contact with the case. The spring $k$ exercises a slight pressure upon the fence, to insure its entry into the notches in the tumblers. The action of the pin $m'$ closes the bell-circuit by lifting $k'$, Fig. 18, at every revolution of the driving-tumbler in either direction, and the operator, knowing the combination, can observe whether the dial L is properly adjusted, and if not, by loosening the thumb-screw $n$ he can properly adjust the dial. Supposing the safe to have been closed for the night, as before described, the rotation of the wheel S will, after a given time—say four hours—release $b^2$, allowing R and the spring $r'$ to fall, thus opening the circuit, and then no one can have access to the vault until morning; but with my devices, the banker can have access to the vault for a limited period in the morning before the time mechanism unlocks the same, if desired. This result is accomplished by the action of the pin $u'$ upon the under side of the movable part R. This pin, coming in contact with such part before the hour for unlocking by the time mechanism, lifts R and the spring $r'$, closing the circuit, and then the banker, knowing the combination, can open the vault by means of the electric mechanism rotating the crank $r$, as before described. The length of time prior to the opening of the safe in the morning by the time mechanism, during which the banker can so have access to it, is determined by the position of the pin $u'$. It may be so located in the wheel S that it will operate upon the movable part R one, two, or more hours before the pin $t'$ reaches the lever $j$. The upper end of this lever $j$ is bent, as shown in Fig. 24, so that the pin $t'$ engages with it, but the pin $u'$ passes it without engagement.

The banker may, after he has removed from his safe in the morning the things which he supposes he will want during the day, set the time mechanism to unlock at a predetermined hour—say four o'clock—and at the same time, by means of the device T and rod $h^2$, he can close the circuit by forcing $s'$ down onto $r'$, and then during the day he can, if he wishes, have access to the vault by the use of the electric mechanism. The pin $u'$ will, however, prior to the hour for unlocking by the time mechanism, come in contact with the under side of R, lifting it and $r'$, which will bring T into the position shown in Fig. 20, the circuit, however, still remaining closed. It will be seen that R is raised by the pin $u'$ acting on its under side, and that when the pin leaves R it will drop down and open the circuit.

I have shown magnets for vibrating the pallets in both directions; but I do not limit myself to this construction, because a return-spring might be used to move the pallets in one direction, as in telegraph-instruments, and then only one-half of the number of magnets shown would be required.

Methods of switching the current to make two or more strokes with one contact are well-known and need not be here described.

I do not confine myself to four operating-wires and two wires for the bell, since well-known means for reducing the number and producing the same result are open for use.

I have thus far shown and described my improvements adapted for use in connection with automatic locking and unlocking devices consisting of springs; but my improvements may be connected with other automatic locking and unlocking devices.

Figure 32:
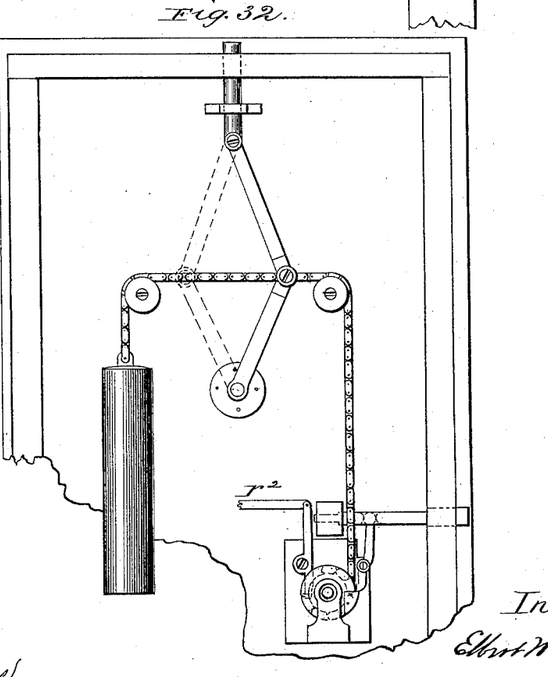
Fig. 32 is an elevation showing devices which act on the bolt-work in both directions, the power acting in only one direction, and means for applying my improvements to such devices.

In Fig. 32 I have shown a locking and unlocking device already in use, consisting of a toggle-lever for operating the bolts and a weight which both casts and retracts the bolts, the weight constantly acting in one direction and throwing the toggle-levers to the center to cast the bolts and from the center to retract the same. In this Fig. 32, $r^2$ is a bar, one end of which bar is connected with a tripping device, which, when tripped, allows the weight to act on the locking mechanism. My electric mechanism can be connected with this bar $r^2$, substantially as before described. In this figure the time mechanism is not shown, but is to be applied in any well-known manner.

Figure 33:
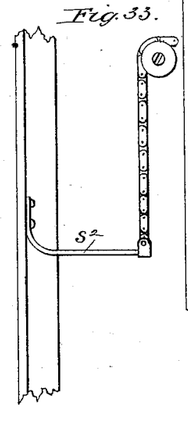
Fig. 33 shows a spring for throwing the bolt-work, in place of the weight shown in Fig. 32.

In Fig. 33, $s^2$ is a spring which takes the place of the weight in Fig. 32.

Figure 34:
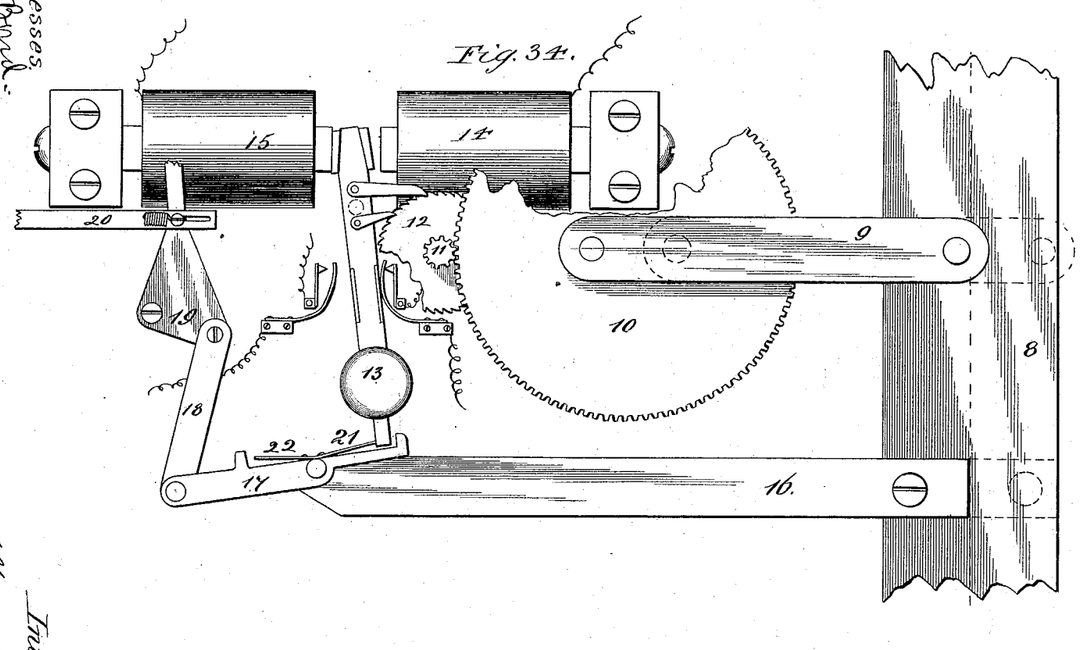
Fig. 34 is an elevation showing devices for automatically operating the bolt-work step by step by electricity, and means for applying my improvements thereto.

In Fig. 34 I have shown another modification. In this figure, 8 is a carrying-bar, connecting the bolts of a safe or vault door, moved forward and back by a pitman, 9, as the spur-wheel 10 revolves on its axis, this wheel being driven by a spur-pinion, 11, secured to and turning with a ratchet-wheel, 12, which is driven by two pawls hinged to and working with a pendulum, 13, which pendulum is oscillated by magnets 14 15, alternately acting on armatures attached thereto. When the pendulum vibrates to the right, as shown in the drawings, it connects the circuit for the magnet 14 and disconnects the magnet 15, and vice versa. The arm 16, projecting from the carrier-bar, carries a stop, 17, connected by a pitman, 18, and bell-crank lever 19, to an arm, 20, of the electric mechanism. The stop 17 is provided with springs 21 and 22, to catch and retain the pendulum, as shown in the drawings. When the electric mechanism is unlocked and the bolt-work retracted, the spring 21 holds the pendulum. When the electric mechanism is locked, the pendulum is released from the spring 21, and the wheel 10 moves a half-revolution, and the bolt is thrown into a locked position, and the pendulum will be caught and held by the spring 22.

I do not claim in this application the mechanism shown in Fig. 34 of the drawings, but I propose to make it the subject of a separate case.

What I claim as new, and desire to secure by Letters Patent, is—

1. In combination with an electro-magnetic permutation-engine located in a safe or vault, and a detent to control the automatic unlocking mechanism of the safe or vault, and to be operated from the outside thereof, electrical connections, as described, of a dial outside of the safe or vault, whereby the instructed operator may know and control the operation of the electro-magnetic permutation-engine, substantially as specified.

2. The combination, with an electro-magnetic permutation-engine having notched tumblers rotated step by step by an electric motor to bring the notches of said tumblers into combination to admit the fence into the notches, of an indicator-dial-gear mechanism to rotate the dial while such tumblers are rotating, to indicate their position, substantially as specified.

3. A dial located outside of a safe or vault, having means for adjusting it to work in harmony with and to indicate the operation of an electro-magnetic permutation-engine attachment to a device for automatically operating the bolt-work of a safe or vault, substantially as specified.

4. A dial, in combination with its accompanying mechanism for automatically opening and closing an electro-magnetic circuit located outside of a safe or vault, and electrical connections, as described, to operate an electro-magnetic permutation-engine located in a safe or vault, and a detent to control the unlocking mechanism, substantially as specified.

5. An automatic switch and electric connections, as described, to shift the electric current for the purpose of rotating the tumblers in an electro-magnetic permutation-engine in opposite directions, in combination with an adjustable dial to indicate the movements of the tumblers, substantially as specified.

6. Notched tumblers driven by a pin in a driving-tumbler rotated step by step by electro-magnets, in combination with an adjustable dial and an indicator to show whether the driving-tumbler is running in harmony with the dial, substantially as specified.

7. An indicator located outside of a safe or vault and electric connections with mechanism inside of the safe, in combination with toothed wheels, pallets, tumblers, a fence in an electro-magnetic permutation-engine for use within a safe or vault, and a detent to control the automatic unlocking mechanism, substantially as specified.

8. One tumbler driven by another in an electro-magnetic permutation-engine, and a detent for controlling the bolt-moving power, in combination with a dial or index, with electric connections to guide the unlocking of a safe or vault, substantially as specified.

9. An electro-magnetic permutation-engine having an adjustable tumbler, in combination with a dial and electric circuits and a fence, substantially as specified.

10. In combination with a device for automatically retracting the bolts of a safe or vault door, a cushion to protect the parts of said device from the strain of the operating-power, and an electro-magnetic permutation-engine, and the detent controlling the release of the operating-power, substantially as specified.

11. The combination, with the bolt-work of a safe or vault door, of a device for automatically retracting the bolts, an electro-magnetic permutation-engine for releasing the retracting-power, a dial electrically connected therewith, and a compound lever located between the retracting-power and the electro-magnetic permutation-engine, for the purpose of reducing the power required to be exerted by the electro-magnetic permutation-engine to release the retracting-power, substantially as specified.

12. In combination with the bolt-work of a safe or vault door, a detent for holding an automatic retracting-power in check, an electro-magnetic permutation-engine capable of being set by one instructed to release said detent, a cushion to protect the casting and retracting mechanism from injury by the action of the retracting-power when released, and a dogging-piece, $k^2$, which will ordinarily be inoperative, but which, in case the retracting-power be prematurely released by violence applied to the door, will then be brought into such position that the said power will be inoperative to retract the bolts, substantially as specified.

13. In combination with the bolt-work of a safe or vault door, a device for automatically casting the bolts, a stop to hold the bolts retracted after the casting-power has been set preparatory to closing the door, which stop will release said casting-power automatically when the door is closed, a device for automatically retracting the bolts, and an electric mechanism capable of being set to release said retracting-power, substantially as specified.

14. In combination with the bolt-work of a safe or vault door, and power for automatically operating the bolts, a time mechanism, and an electro-magnetic permutation-engine, substantially as set forth, whereby either or both of them may operate the restraining-detent, and thereby release said power, substantially as specified.

15. In combination with the bolt-work of a safe or vault, an electro-magnetic permutation-engine, and a time-mechanism circuit-controller, by means of which the electric circuit can be automatically opened or closed at a predetermined time, whereby a person setting the time mechanism can determine the time during which the electro-magnetic permutation-engine may or may not be used to bring into action the power of a device to automatically retract the bolts, substantially as specified.

16. An electro-magnetic permutation-engine, in combination with a time mechanism arranged to connect or disconnect the operating electric circuit, and a supplemental device for connecting or disconnecting the electric circuit by hand to enable the electro-magnetic permutation-engine to be used without the time mechanism, to bring into use the power of a device to automatically retract the bolts of a safe or vault door, substantially as specified.

17. An electro-magnetic permutation-engine, in combination with a switching mechanism so arranged that the electric circuit can be opened or closed by hand to enable it to be brought into use to release the power of a device for automatically retracting the bolts of a safe or vault door, and a time mechanism that may be used to automatically restore the hand switching mechanism to its normal position, substantially as specified.

ELBERT W. FOWLER.

Witnesses:
O. W. BOND,
HARRY T. JONES.